US012671890B2

(12) United States Patent
Dal Zotto et al.

(10) Patent No.: US 12,671,890 B2
(45) Date of Patent: Jun. 30, 2026

(54) ACTIVE IMAGE SENSORS

(71) Applicant: Hewlett-Packard Development Company, L.P., Spring, TX (US)

(72) Inventors: Rafael Dal Zotto, Porto Alegre (BR); Qian Lin, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 48 days.

(21) Appl. No.: 18/689,048

(22) PCT Filed: Sep. 27, 2021

(86) PCT No.: PCT/US2021/052195
§ 371 (c)(1),
(2) Date: Mar. 4, 2024

(87) PCT Pub. No.: WO2023/048731
PCT Pub. Date: Mar. 30, 2023

(65) Prior Publication Data
US 2024/0430562 A1 Dec. 26, 2024

(51) Int. Cl.
*H04N 23/611* (2023.01)
*H04N 23/60* (2023.01)

(52) U.S. Cl.
CPC ........... *H04N 23/611* (2023.01); *H04N 23/64* (2023.01)

(58) Field of Classification Search
CPC ...... H04N 23/611; H04N 23/64; H04N 7/142; H04N 7/147

USPC ...................................................... 348/222.1
See application file for complete search history.

(56) References Cited

U.S. PATENT DOCUMENTS

| | | | |
|---|---|---|---|
| 9,430,040 B2 * | 8/2016 | Zhang | G06V 40/193 |
| 11,343,420 B1 * | 5/2022 | Herz | G06F 3/0485 |
| 11,758,260 B1 * | 9/2023 | Agrawal | H04N 23/90 348/333.03 |
| 2009/0315971 A1 * | 12/2009 | Graham | H04N 7/14 348/14.1 |
| 2010/0328444 A1 * | 12/2010 | Blixt | A61B 3/145 348/78 |
| 2016/0286120 A1 * | 9/2016 | Kuo | H04N 23/63 |
| 2017/0064210 A1 * | 3/2017 | Ohno | H04N 23/90 |
| 2018/0129279 A1 * | 5/2018 | Melman | G06V 40/19 |
| 2018/0157909 A1 * | 6/2018 | Ollila | G06V 40/19 |
| 2018/0376129 A1 * | 12/2018 | Lee | H04N 13/128 |
| 2020/0045261 A1 * | 2/2020 | Lim | H04N 5/44504 |
| 2022/0311952 A1 * | 9/2022 | Vanka | G06F 3/017 |

* cited by examiner

*Primary Examiner* — Usman A Khan
(74) *Attorney, Agent, or Firm* — Quarles & Brady LLP

(57) ABSTRACT

In some examples, a non-transitory machine-readable medium stores machine-readable instructions which, when executed by a processor of an electronic device, cause the processor to detect, by multiple image sensors, a user presence, to determine, responsive to the detection of the user presence, eye gaze angles of a user in relation to optical axes of the multiple image sensors, to identify a smallest eye gaze angle among the eye gaze angles, and to cause an image sensor of the multiple image sensors that has the smallest eye gaze angle to be an active image sensor of the electronic device.

18 Claims, 7 Drawing Sheets

302

306B

308B

304

300

306A

308A

304

700

702
Processor

704

Detect, by multiple image sensors, a user — 706

Determine eye gaze angles of a user in relation to optical axes of the multiple image sensors — 708

Identify a smallest eye gaze angle of the eye gaze angles — 710

Cause an image sensor that has the smallest eye gaze angle to be an active image sensor — 712

ACTIVE IMAGE SENSORS

BACKGROUND

Electronic devices such as notebooks, laptops, desktops, tablets, and smartphones include image sensors that enable the electronic devices to capture images. During a video-conference or other livestreaming event, an electronic device utilizes an image sensor to enable a user to share audiovisual data with an audience, for instance.

BRIEF DESCRIPTION OF THE DRAWINGS

Various examples are described below referring to the following figures.

DETAILED DESCRIPTION

Figure 1:
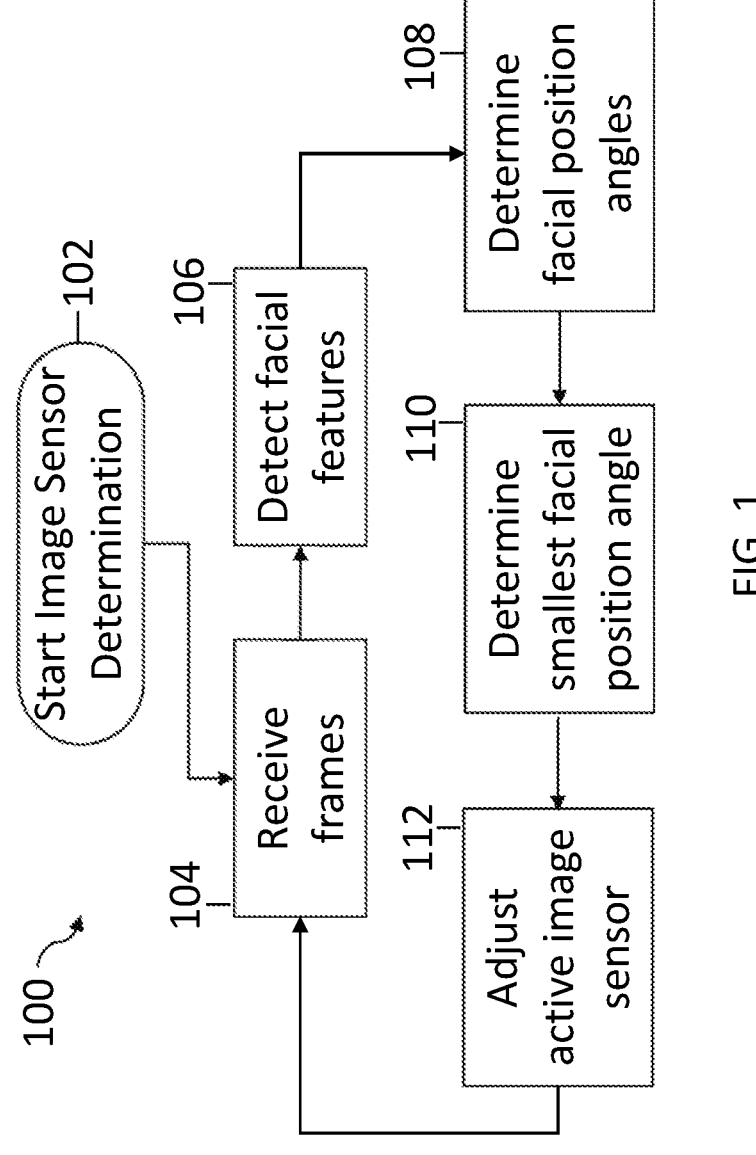
FIG. 1 is a flow diagram depicting a method for an electronic device to adjust an active image sensor, in accordance with various examples.

As described above, electronic devices include image sensors to enable users to share audiovisual data with audiences during livestreaming events. In some instances, an electronic device includes multiple image sensors. The multiple image sensors allow a user to interact with multiple display devices and to switch between tasks, for instance. However, depending on which image sensor of the multiple image sensors is an active image sensor, a video signal may portray the user as gazing in a direction other than toward an audience. The active image sensor, as used herein, is an image sensor utilized to capture images for display, transmission, or a combination thereof. The portrayal is based on the user's facial position angle, eye gaze angle, or a combination thereof, relative to an optical axis of an image sensor. The optical axis, as used herein, is an imaginary line along which there is a degree of rotational symmetry in the image sensor. The facial position angle, as used herein, is an angle between a central axis of the user's face and the optical axis of the image sensor. The optical axis, as used herein, is an imaginary line along which there is a degree of rotational symmetry in the image sensor. The central axis, as used herein, is an imaginary line that bisects facial features of the user from a center of the forehead, through the nose, mouth, and chin. The eye gaze angle, as used herein, is an angle between the user's eye gaze and the optical axis of the image sensor. The lack of eye contact creates an impression that the user is not engaging with the audience, hindering communication between the user and the audience. The user may adjust the active image sensor to another image sensor of the multiple image sensors. However, a time taken by the user to make adjustments interrupts user engagement with the audience and reduces user productivity.

To facilitate an appearance of user eye contact with the audience, an electronic device adjusts an active image sensor between multiple image sensors based upon which image sensor of the multiple image sensors captures a smallest facial position angle, a smallest eye gaze angle, or a combination thereof. The smallest facial position angle, as used herein, is a facial position angle that has a smallest value among the facial position angles determined for the multiple image sensors. The smallest eye gaze angle, as used herein, is an eye gaze angle that has a smallest value among the eye gaze angles determined for the multiple image sensors. The electronic device determines facial position angles, eye gaze angles, or a combination thereof, for the multiple image sensors. The electronic device determines which of the facial position angles is the smallest facial position angle, which of the eye gaze angles is the smallest eye gaze angle, or a combination thereof. The electronic device causes the active image sensor to be the image sensor having the smallest facial position angle, the smallest eye gaze angle, or a combination thereof. Responsive to the user adjusting facial position, eye gaze, or a combination thereof, the electronic device repeats the determination of facial position angles, eye gaze angles, or a combination thereof. Responsive to a determination that a different image sensor has the smallest facial position angle, the smallest eye gaze angle, or a combination thereof, the electronic device causes the active image sensor to be the different image sensor.

Utilizing the electronic device that adjusts the active image sensor among multiple image sensors provides for an enhanced user and audience experience by maintaining an appearance of the user gazing toward the audience. The appearance fosters a perception that the user is engaging with the audience. User productivity is enhanced by enabling the user to refer to multiple reference points during the interaction with the audience without having to maintain focus on a particular image sensor or manually switch between the multiple image sensors.

In some examples in accordance with the present description, a non-transitory machine-readable medium is provided. The non-transitory machine-readable medium stores machine-readable instructions which, when executed by a processor of an electronic device, cause the processor to detect, by multiple image sensors, a user presence, to determine, responsive to the detection of the user presence, eye gaze angles of a user in relation to optical axes of the multiple image sensors, to identify a smallest eye gaze angle among the eye gaze angles, and to cause an image sensor of the multiple image sensors that has the smallest eye gaze angle to be an active image sensor of the electronic device.

In other examples in accordance with the present description, an electronic device is provided. The electronic device includes a first image sensor, a second image sensor, and a processor. The processor is to determine a first eye gaze angle of a user in relation to a first optical axis of the first image sensor, to determine a second eye gaze angle of the user in relation to a second optical axis of the second image sensor, and to adjust, responsive to a determination that the first eye gaze angle is less than the second eye gaze angle, an active image sensor to the first image sensor.

In yet other examples in accordance with the present description, an electronic device is provided. The electronic device includes a first image sensor, a second image sensor, and a processor. The processor is to determine a first facial position angle of a user in relation to a first optical axis of the first image sensor, to determine a second facial position angle of the user in relation to a second optical axis of the second image sensor, and to adjust, responsive to a determination that the first facial position angle is less than the second facial position angle, an active image sensor to the first image sensor.

Referring now to FIG. 1, a flow diagram depicting a method 100 for an electronic device to adjust an active image sensor is provided, in accordance with various examples. The method 100 includes a start point 102 during which the electronic device starts processing frames captured by multiple image sensors. During a receive process 104 of the method 100, the electronic device receives the frames from the multiple image sensors. The electronic device analyzes the frames to detect facial features during a detect process 106 of the method 100. During a determine process 108 of the method 100, utilizing the facial features detected during the detect process 106, the electronic device determines facial position angles for the multiple image sensors. During a determine process 110 of the method 100, the electronic device determines which of the multiple image sensors has a smallest facial position angle of the facial position angles determined during the determine process 108. The electronic device adjusts an active image sensor to the image sensor having the smallest facial position angle during an adjust process 112 of the method 100. The electronic device returns to the receive process 104.

In some examples, the start point 102 occurs in response to an application requesting access to an image sensor. The application is a videoconferencing application or a digital content creator software, for example. As described herein, the terms "applications," "software," and "firmware" are considered to be interchangeable in the context of the examples provided. "Firmware" is considered to be machine-readable instructions that a processor of the electronic device executes prior to execution of an operating system (OS) of the electronic device, with a small portion that continues after the OS bootloader executes (e.g., a callback procedure). "Applications" and "software" are considered broader terms than "firmware," and refer to machine-readable instructions that execute after the OS bootloader starts, through OS runtime, and until the electronic device shuts down. "Application," "software," and "firmware," as used herein, are referred to as executable code.

During the receive process 104, the electronic device receives a frame from a first image sensor of the multiple image sensors, a frame from a second image sensor of the multiple image sensors, etc. In various examples, during the detect process 106, the electronic device utilizes a face detection technique to detect facial features of the user in the multiple frames received during the receive process 104. For example, the electronic device decomposes a frame of the multiple frames. The electronic device decomposes the frame utilizing a pre-processing technique, for example. Decomposing, as used herein, reduces objects to edge-like structures. The pre-processing techniques include grayscaling, blurring, sharpening, thresholding, resizing, cropping, or a combination thereof, for example. The electronic device utilizes the face detection technique to determine whether low intensity regions of the decomposed frame include facial features. The facial features include eyebrows, eyes, a nose, lips, hairline, jawline, or a combination thereof, for example.

In other examples, during the detect process 106, determine process 108, or a combination thereof, the electronic device utilizes a machine learning technique to detect the facial features, determine the facial position angles, or a combination thereof. The machine learning technique compares the facial features to multiple templates to determine that the features indicate a face. In various examples, the electronic device utilizes a machine learning technique that implements a convolution neural network (CNN) to determine whether the image includes the face. The CNN is trained with a training set that includes multiple images of multiple users, for example. The multiple images include users having different facial positions. Utilizing the trained CNN, the electronic device identifies facial features of the image, classifies the facial features, and determines a central axis of the face. In some examples, the CNN implements a Visual Geometry Group (VGG) network, a Residual Network (ResNet) network, a SqueezeNet network, an AlexNet network, or a LeNet network. The electronic device utilizes the central axis of the face to determine the facial position angle relative to the optical axis of the image sensor utilized to capture the frame of the face.

In various examples, responsive to a determination that a frame of the multiple frames includes the user and the remaining frames of the multiple frames do not include the user, the electronic device adjusts the active image sensor to the image sensor having the frame that includes the user and returns to the receive process 104. Responsive to a determination that frames from multiple image sensors include the user, the electronic device performs the determine processes 108, 110 and the adjust process 112.

In some examples, to determine the facial position angle relative to the optical axis during the determine process 108, the electronic device utilizes the face detection technique to determine distances and positions of the facial features relative to each other, to determine positions of the facial features relative to non-facial regions, to compare the facial features to different facial position templates, or a combination thereof. In various examples, the electronic device determines distances and positions of the facial features relative to each other, determines positions of the facial features relative to non-facial regions, or a combination thereof to determine a location of a central axis of the facial features. The electronic device determines the facial position angle based on an angle between the central axis and the optical axis. In other examples, during the determine process 108, the electronic device determines distances between the facial features and compares the measurements to measurements of the facial features of different facial position templates to determine the facial position angle. The facial position templates include a template for a left three-quarter view, a right three-quarter view, a full-frontal view, a left profile view, a right profile view, a frontal view from below, a frontal view from above, or some combination thereof, for example. The electronic device determines the facial position angle based on the facial position template that the facial position of the user most resembles, for example.

While in the examples described above the electronic device performs the detect process 106 and the determine process 108, sequentially, in other examples, the electronic device performs the detect process 106 and the determine process 108 concurrently. For example, while determining a facial position angle for a frame of a first image sensor of the multiple image sensors, the electronic device detects facial features of a frame of a second image sensor of the multiple image sensors.

During the determine process 110, the electronic device determines which of the multiple image sensors has a smallest facial position angle. For example, during the determine process 108, the electronic device determines the frame from the first image sensor of the multiple image sensors has a facial position angle of five degrees, and the frame from the second image sensor of the multiple image sensors has a facial position angle of twenty degrees. During the determine process 110, the electronic device determines that five degrees is less than twenty degrees, and that five degrees is the facial position angle of the facial position angles that is the smallest facial position angle. Because the first image sensor has the facial position angle of five degrees, during the adjust process 112, the electronic device adjusts the active image sensor to be the first image sensor.

Figure 2:
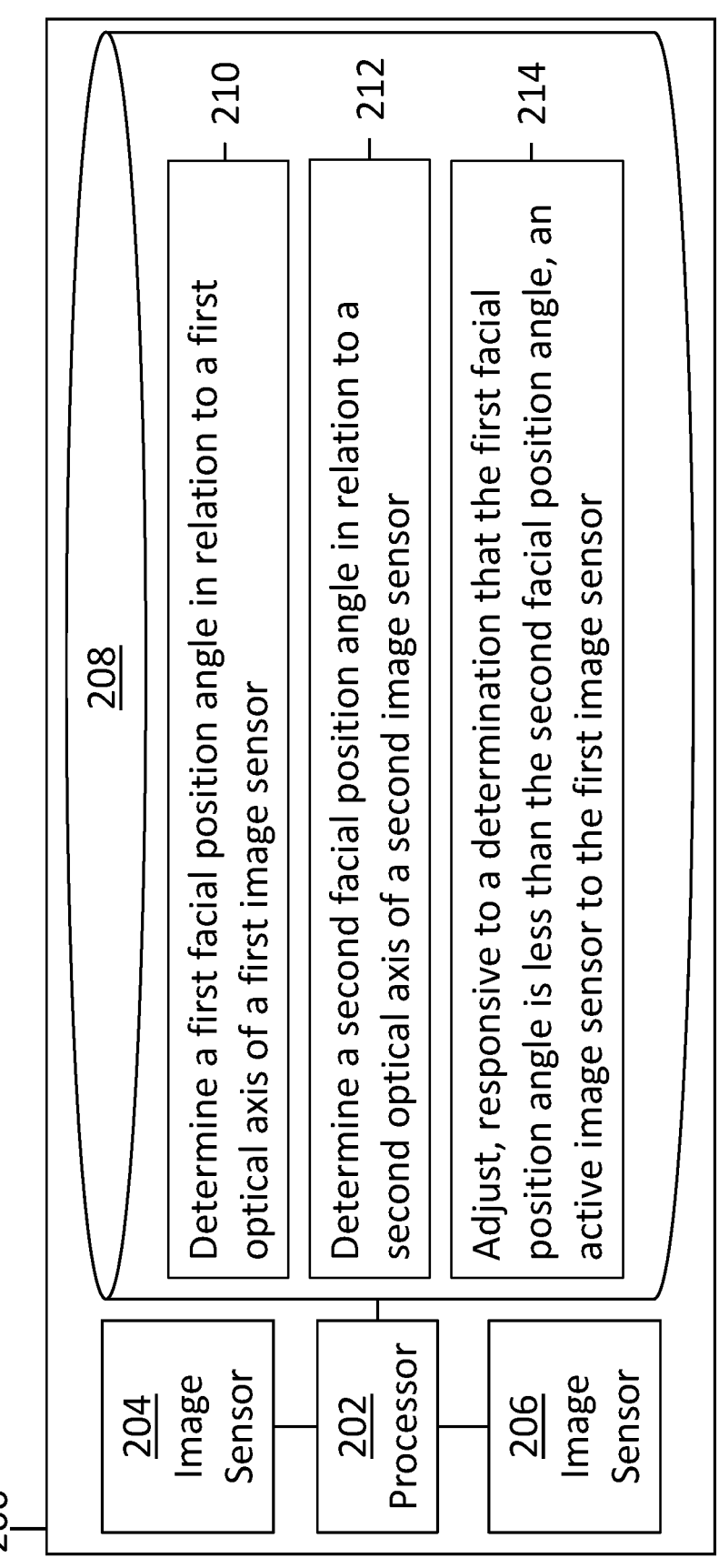
FIG. 2 is a schematic diagram depicting an electronic device to adjust an active image sensor, in accordance with various examples.

Referring now to FIG. 2, a schematic diagram depicting an electronic device 200 to adjust an active image sensor is provided, in accordance with various examples. The electronic device 200 is a desktop, a laptop, a notebook, a tablet, a smartphone, or any other suitable computing device for receiving and processing images. The electronic device 200 includes a processor 202, image sensors 204, 206, and a storage device 208. The processor 202 is a microprocessor, a microcomputer, a microcontroller, or another suitable processor or controller for managing operations of the electronic device 200. The processor 202 is a central processing unit (CPU), graphics processing unit (GPU), system on a chip (SoC), image signal processor (ISP), or a field programmable gate array (FPGA), for example. The image sensors 204, 206 are internal cameras, external cameras, or any other suitable devices for capturing an image, recording a video signal, or a combination thereof. The storage device 208 includes a hard drive, solid state drive (SSD), flash memory, random access memory (RAM), or other suitable memory for storing data or executable code of the electronic device 200.

While not explicitly shown, the electronic device 200 includes network interfaces, video adapters, sound cards, local buses, peripheral devices (e.g., a keyboard, a mouse, a touchpad, a speaker, a microphone, a display device) wireless transceivers, connectors, or a combination thereof. While the image sensors 204, 206 are shown as integrated image sensors of the electronic device 200, in other examples, the image sensor 204, the image sensor 206, or a combination thereof couples to any suitable connection for enabling communications between the electronic device 200 and the image sensor 204, the image sensor 206, or a combination thereof. The connection may be via a wired connection (e.g., a Universal Serial Bus (USB)) or via a wireless connection (e.g., BLUETOOTH®, WI-FI®).

In some examples, the processor 202 couples to the image sensors 204, 206, and the storage device 208. The storage device 208 stores machine-readable instructions which, when executed by the processor 202, cause the processor 202 to perform some or all of the actions attributed herein to the processor 202. The machine-readable instructions are the machine-readable instructions 210, 212, 214.

In various examples, the machine-readable instructions 210, 212, 214, when executed by the processor 202, cause the processor 202 to adjust the active image sensor of the electronic device 200. The machine-readable instruction 210, when executed by the processor 202, causes the processor 202 to determine facial position angles in relation to optical axes of image sensors 204, 206. The machine-readable instruction 212, when executed by the processor 202, causes the processor 202 to determine which of the facial position angles is a smallest facial position angle. The machine-readable instruction 214, when executed by the processor 202, causes the processor 202 to adjust the active image sensor to the image sensor (e.g., the image sensor 204, 206) that has the smallest facial position angle.

For example, the machine-readable instruction 210, when executed by the processor 202, causes the processor 202 to determine a first facial position angle of a user in relation to a first optical axis of the image sensor 204 and to determine a second facial position angle of the user in relation to a second optical axis of the image sensor 206. To determine the facial position angles, the processor 202 utilizes the techniques described above with respect to FIG. 1, for example. The machine-readable instruction 212, when executed by the processor 202, causes the processor 202 to determine that the first facial position angle is less than the second facial position angle. The machine-readable instruction 214, when executed by the processor 202, causes the processor 202 to adjust, responsive to the determination that the first facial position angle is less than the second facial position angle, the active image sensor to the image sensor 204.

In another example, the machine-readable instruction 212, when executed by the processor 202, causes the processor 202 to determine that the second facial position angle is less than the first facial position angle. The machine-readable instruction 214, when executed by the processor 202, causes the processor 202 to adjust the active image sensor to the image sensor 206. In some examples, the processor 202 causes a display device (not explicitly shown) to display a video signal of the active image sensor, a network interface (not explicitly shown) to transmit the video signal of the active image sensor, or a combination thereof.

In some examples, the processor 202 determines a first eye gaze angle of the user in relation to the first optical axis of the first image sensor (e.g., the image sensor 204) and determines a second eye gaze angle of the user in relation to the second optical axis of the second image sensor (e.g., the image sensor 206). The processor 202 determines the first and the second eye gaze angles utilizing the techniques described below with respect to FIG. 4, for example. The processor 202 determines whether the first eye gaze angle or the second eye gaze angle is the smallest eye gaze angle and adjusts the active image sensor to the image sensor having the smallest eye gaze angle. For example, responsive to a determination that the second eye gaze angle is less than the first eye gaze angle, the processor 202 adjusts the active image sensor to the second image sensor. In another example, responsive to a determination that the first eye gaze angle is less than the second eye gaze angle, the processor 202 adjusts the active image sensor to the first image sensor. In various examples, responsive to a determination that a first facial position angle and a second facial position angle are within a proximity threshold, the processor 202 determines the first eye gaze angle and the second eye gaze angle. For example, responsive to a determination that the first and the second facial position angles are within seven degrees of each other, the processor 202 determines the first eye gaze angle and the second eye gaze angle. In some examples, the proximity threshold is a setting that is adjustable utilizing a graphical user interface (GUI).

In various examples, the processor 202 detects a change in the facial position angle of the user in relation to an optical axis of the active image sensor. Responsive to a determination that the change exceeds a facial position angle threshold, the processor 202 determines a third facial position angle of the user in relation to the first optical axis of the first image sensor, determines a fourth facial position angle of the user in relation to the second optical axis of the second image sensor, and adjusts the active image sensor to the image sensor having the smallest facial position angle. For example, responsive to a determination that the fourth facial position angle is less than the third facial position angle, the processor 202 adjusts the active image sensor to the second image sensor. In another example, responsive to a determination that the third facial position angle is less than the fourth facial position angle, the processor 202 adjusts the active image sensor to the first image sensor.

In other examples, the processor 202 detects a change in the facial position angle of the user in relation to the optical axis of the active image sensor. Responsive to a determination that the change exceeds the facial position angle threshold, the processor 202 determines a first eye gaze angle of the user in relation to the first optical axis of the first image sensor, determines a second eye gaze angle of the user in relation to the second optical axis of the second image sensor, and adjusts the active image sensor to the image sensor having the smallest eye gaze angle. For example, responsive to a determination that the second eye gaze angle is less than the first eye gaze angle, the processor 202 adjusts the active image sensor to the second image sensor. In another example, responsive to a determination that the first eye gaze angle is less than the second eye gaze angle, the processor 202 adjusts the active image sensor to the first image sensor.

In some examples, responsive to detecting a change in the facial position angle, the eye gaze angle, or a combination thereof, the processor 202 allows a duration of time to elapse. The duration of time is thirty seconds, a minute, or some other period of time that enables the user to look away to take notes, refer to other documentation, or perform another task related to the virtual meeting, for example. After the duration of time elapses, the processor 202 determines whether the facial position angle exceeds the facial position angle threshold, the eye gaze angle exceeds an eye gaze angle threshold, or a combination thereof. Responsive to a determination that the facial position angle threshold, the eye gaze angle threshold, or a combination thereof, are exceeded, the processor 202 adjusts the active image sensor. In various examples, the duration of time, the facial position angle threshold, the eye gaze angle threshold, or a combination thereof, are settings that the user adjusts utilizing a graphical user interface (GUI).

Figure 3B:
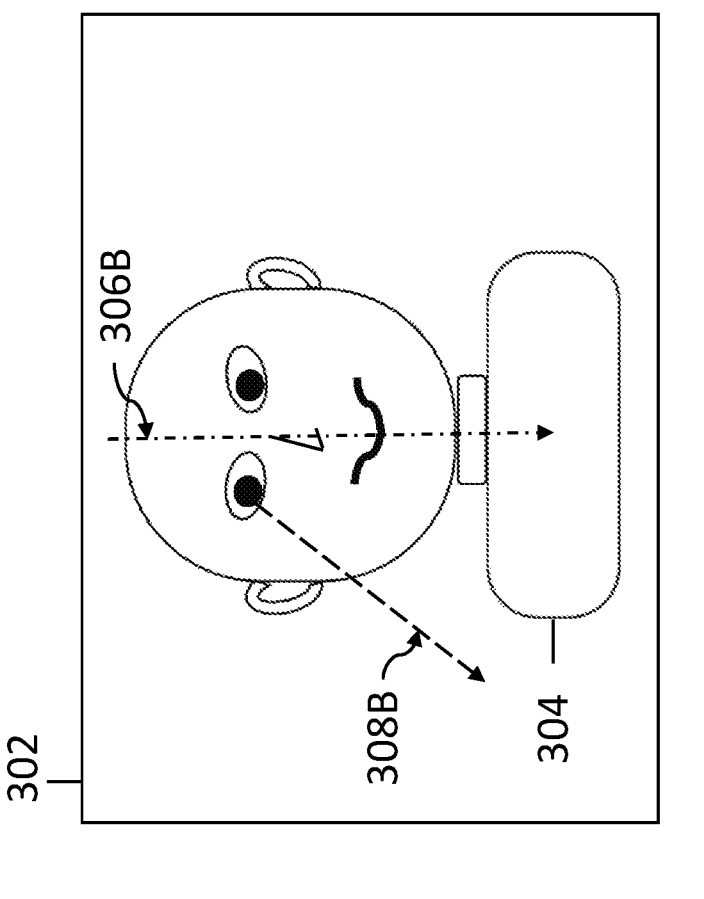
FIGS. 3A and 3B are examples depicting frames utilized by an electronic device to adjust an active image sensor, in accordance with various examples.
Figure 3A:
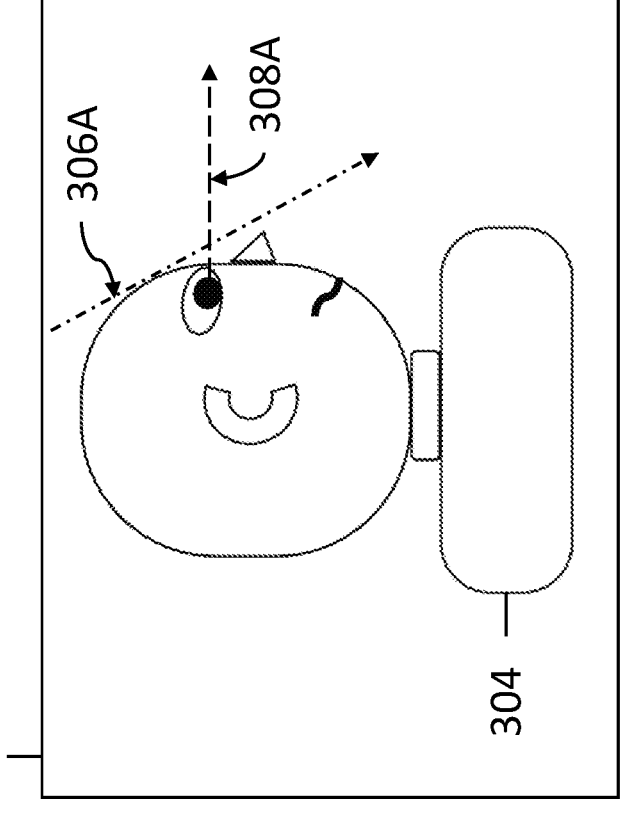

Referring now to FIGS. 3A and 3B, examples depicting frames 300, 302 utilized by an electronic device (e.g., the electronic device 200) to adjust an active image sensor are provided, in accordance with various examples. FIG. 3A shows the frame 300. The frame 300 is captured by a first image sensor (e.g., the image sensor 204) of the electronic device. The frame 300 includes a user 304 having an eye gaze 308A. A central axis 306A represents a central axis of a face of the user 304. FIG. 3B shows the frame 302. The frame 302 is captured by a second image sensor (e.g., the image sensor 206) of the electronic device. The frame 302 includes the user 304 having an eye gaze 308B. A central axis 306B represents a central axis of the face of the user 304.

In various examples, a processor (e.g., the processor 202) of the electronic device determines a first facial position angle of the user 304 in relation to a first optical axis of the first image sensor and determines a second facial position angle of the user 304 in relation to a second optical axis of the second image sensor. For example, the processor determines the first facial position angle is 45 degrees and the second facial position angle is zero degrees. The processor determines that the second facial position angle is the smallest facial position angle and adjusts the active image sensor to the second image sensor.

In some examples, the processor determines a first eye gaze angle of the user 304 in relation to the first optical axis of the first image sensor and determines a second eye gaze angle of the user 304 in relation to the second optical axis of the second image sensor. For example, the processor determines that the first eye gaze angle is 90 degrees and the second eye gaze angle is 45 degrees. The processor determines the second eye gaze angle is the smallest eye gaze angle and adjusts the active image sensor to the second image sensor.

The electronic device that adjusts the active image sensor among multiple image sensors provides for an enhanced user and audience experience by maintaining an appearance of the user gazing toward the audience. The appearance fosters a perception that the user is engaging with the audience. User productivity is enhanced by enabling the user to refer to multiple reference points during the interaction with the audience without having to maintain focus on a particular image sensor or manually switch between the multiple image sensors.

Figure 4:
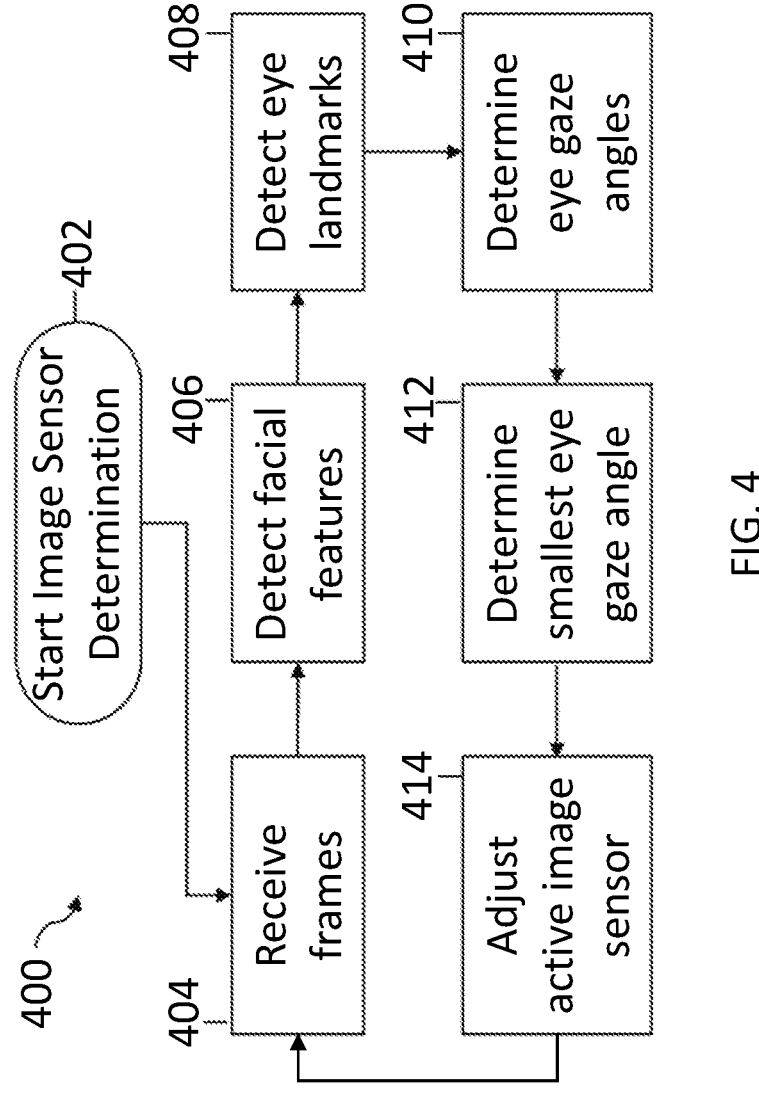
FIG. 4 is a flow diagram depicting a method for an electronic device to adjust an active image sensor, in accordance with various examples.

Referring now to FIG. 4, a flow diagram depicting a method 400 for an electronic device (e.g., the electronic device 200) to adjust an active image sensor is provided, in accordance with various examples. The method 400 includes a start point 402 during which the electronic device starts processing frames (e.g., the frames 300, 302) captured by multiple image sensors (e.g., the image sensors 204, 206). During a receive process 404 of the method 400, the electronic device receives the frames from the multiple image sensors. The electronic device analyzes the frames to detect facial features during a detect process 406 of the method 400. The electronic device utilizes the techniques described above with respect to FIG. 1, for example, to detect the facial features. During a detect process 408 of the method 400, utilizing the facial features detected during the detect process 406, the electronic device detects eye landmarks. The electronic device utilizes the eye landmarks to determine eye gaze angles for the multiple image sensors during a determine process 410 of the method 400. During a determine process 412 of the method 400, the electronic device determines which of the multiple image sensors has a smallest eye gaze angle of the eye gaze angles determined during the determine process 410. The electronic device adjusts an active image sensor to the image sensor having the frame that has the smallest eye gaze angle during an adjust process 414 of the method 400. The electronic device returns to the receive process 404.

The electronic device detects the facial features and eye landmarks utilizing the techniques described above with respect to FIG. 1, for example, during the detect processes 406, 408. The eye landmarks include outer corners, inner corners, irises, pupils, or a combination thereof. During the determine process 410, the electronic device determines an eye gaze angle relative to an optical axis of an image sensor by utilizing a tracking technique (e.g., an eye tracking technique, a gaze tracking technique, or a combination thereof). For example, the electronic device utilizes the tracking technique to determine an eye gaze direction based on a location of the eye landmarks that are determined utilizing the face detection technique during the determine process 408. In various examples, utilizing the face detection technique, the machine learning technique, or a combination thereof, as described above with respect to FIG. 1, the electronic device identifies eyes of a user (e.g., the user 304) in a frame recorded by the image sensor. The electronic device determines locations of the eye landmarks. Based on the locations of the eye landmarks relative to a location of an intersection of the optical axis of the image sensor with the user, the electronic device determines an eye gaze direction of the user. The electronic device determines the eye gaze angle between the eye gaze direction and the location of the intersection of the optical axis of the image sensor with the user. In another example, the electronic device causes the image sensor to emit an infrared light. The image sensor detects a reflection of the infrared light. The electronic device analyzes data of the reflection to determine the eye gaze angle.

While in the examples described above the electronic device performs the detect processes 406, 408 and the determine process 410, sequentially, in other examples, the electronic device performs the detect processes 406, 408 and the determine process 410 concurrently. For example, the electronic device detects facial features and eye landmarks simultaneously utilizing the machine learning technique described above with respect to FIG. 1. In another example, the electronic device utilizes a machine learning technique that utilizes two levels of CNNs. The first level CNN detects facial features. The second level CNN refines a number of points around the eyes and mouth to enhance an accuracy of the technique. The machine learning technique utilizes a transform to calculate a pitch, a yaw, and a roll for angles of the face. The machine learning technique identifies the eye landmarks and locate the iris utilizing the eye landmarks. Utilizing a location of the iris, the machine learning technique determines the eye gaze angle. In such examples, while determining an eye gaze angle for a frame of a first image sensor of the multiple image sensors, the electronic device detects facial features and eye landmarks of a frame of a second image sensor of the multiple image sensors.

Figure 5:
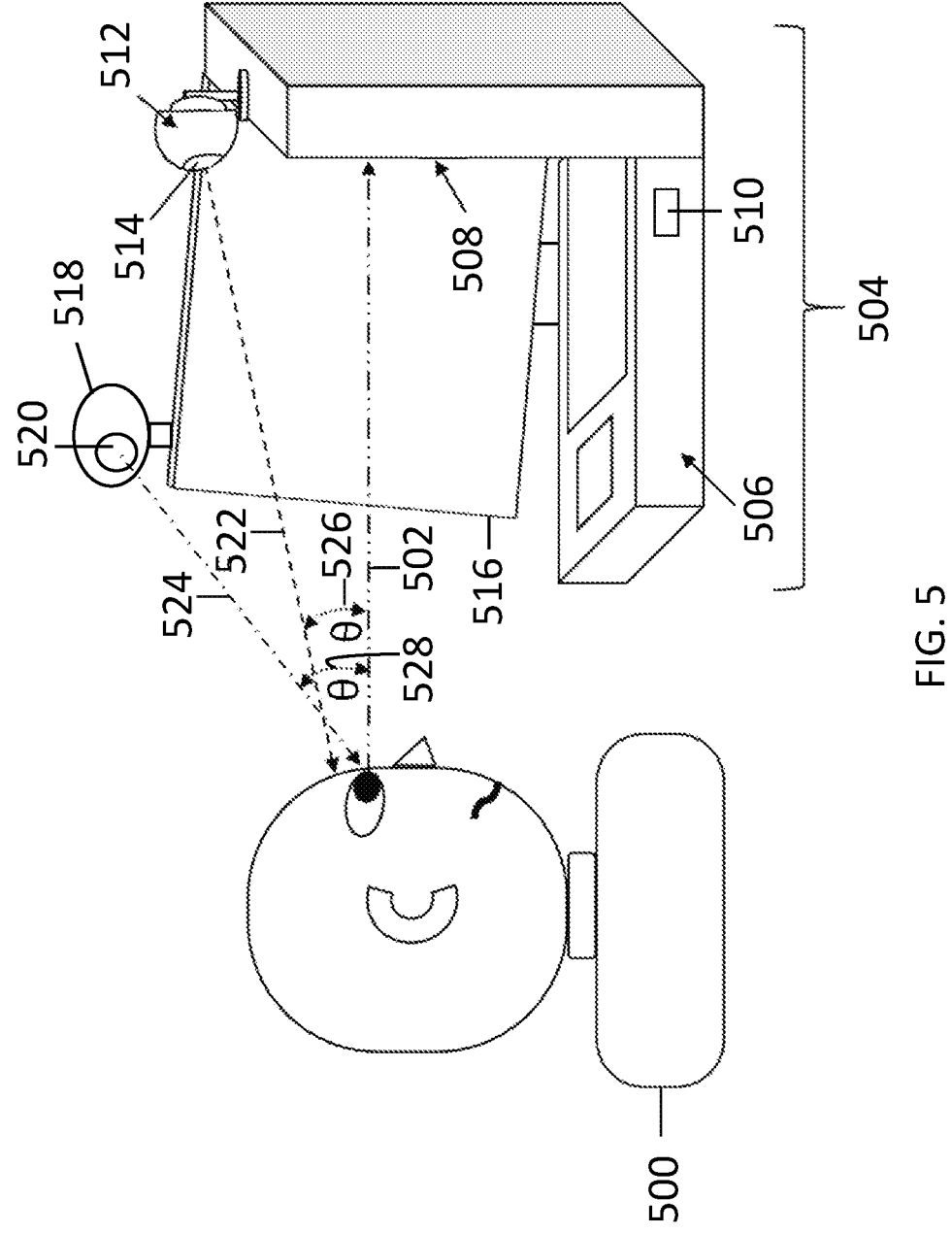
FIG. 5 is a schematic diagram depicting an electronic device to adjust an active image sensor, in accordance with various examples.

Referring now to FIG. 5, a schematic diagram depicting an electronic device 504 to adjust an active image sensor is provided, in accordance with various examples. The electronic device 504 is the electronic device 200, for example. The electronic device 504 includes a chassis 506, image sensors 512, 518, and a display device 516. The chassis 506 houses a display device 508 and a connector 510. The display device 508 is a liquid crystal display (LCD), a light-emitting diode (LED) display, a plasma display, a quantum dot (QD) display, or any suitable device for displaying data of the electronic device 504 for viewing, for example. The connector 510 is any suitable connector that enables a peripheral device to couple to the electronic device 504. The connector 510 is a USB connector, an audio jack connector, a High-Definition Multimedia Interface (HDMI) connector, or a Video Graphics Array (VGA) connector, for example. The image sensors 512, 518, the display device 516, or a combination thereof couples to the electronic device 504 via the connector 510, for example. The image sensor 512 is the image sensor 204, for example. The image sensor 512 includes a lens 514 and has an optical axis 522. The display device 516 is an LCD, an LED display, a plasma display, a QD display, or any suitable device for displaying data of the electronic device 504 for viewing, for example. The image sensor 518 is the image sensor 206, for example. The image sensor 518 includes the lens 520 and has an optical axis 524.

While not explicitly shown, the chassis 506 may include network interfaces, video adapters, sound cards, local buses, peripheral devices (e.g., a keyboard, a mouse, a touchpad, a speaker, a microphone), or a combination thereof. While the display device 508 is shown as an integrated display device, in other examples, the display device 508 may be coupled to the electronic device 504 via a wired connection (e.g., USB, VGA, Digital Visual Interface (DVI), HDMI) or a wireless connection (e.g., WI-FI®, BLUETOOTH®). In various examples, the display device 516 includes connectors (not explicitly shown) to which the image sensor 512, the image sensor 518, or a combination thereof couples.

In various examples, a user 500 interacts with the electronic device 504. The user 500 is the user 304, for example. The user 500 has an eye gaze 502. An eye gaze angle 526 is the angle between the eye gaze 502 of the user 500 and the optical axis 522. An eye gaze angle 528 is the angle between the eye gaze 502 of the user 500 and the optical axis 524. As described above with respect to FIG. 4, the electronic device 504 determines the eye gaze angles 526, 528 for the image sensors 512, 518, respectively. Responsive to a determination that the eye gaze angle 526 is less than the eye gaze angle 528, the electronic device 504 determines that the eye gaze angle 526 is the smallest eye gaze angle and adjusts the active image sensor to the image sensor 512. Responsive to a determination that the eye gaze angle 528 is less than the eye gaze angle 526, the electronic device 504 determines that the eye gaze angle 528 is the smallest eye gaze angle and adjusts the active image sensor to the image sensor 518.

Figure 6:
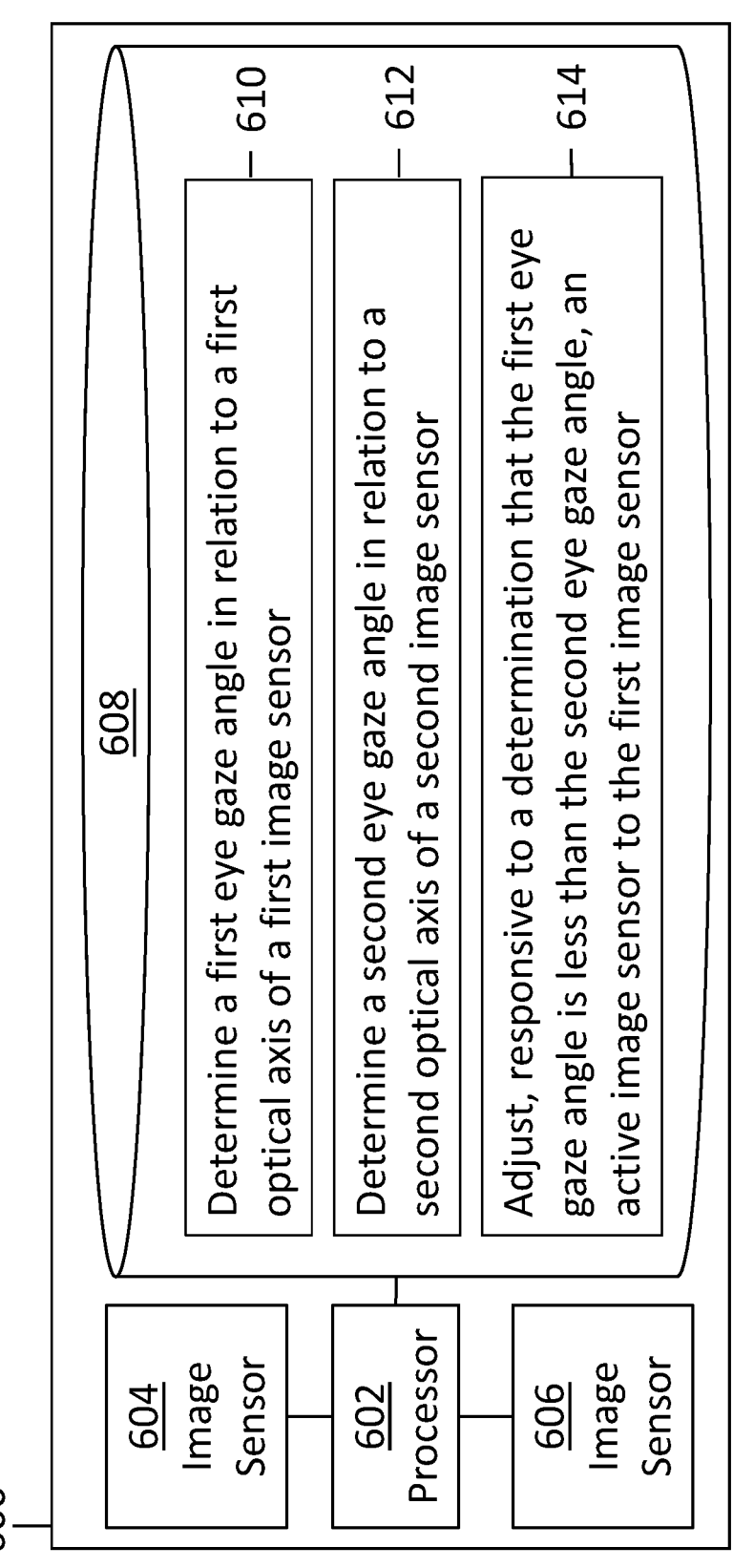
FIG. 6 is a schematic diagram depicting an electronic device to adjust an active image sensor, in accordance with various examples.

Referring now to FIG. 6, a schematic diagram depicting an electronic device 600 to adjust an active image sensor is provided, in accordance with various examples. The electronic device 600 is the electronic device 200, 504, for example. The electronic device 600 includes a processor 602, image sensors 604, 606, and a storage device 608. The processor 602 is the processor 202, for example. The image sensors 604, 606 are the image sensors 204, 206, respectively, for example. The storage device 608 is the storage device 208, for example.

In some examples, the processor 602 couples to the image sensors 604, 606, and the storage device 608. The storage device 608 stores machine-readable instructions which, when executed by the processor 602, cause the processor 602 to perform some or all of the actions attributed herein to the processor 602. The machine-readable instructions are the machine-readable instructions 610, 612, 614.

In various examples, the machine-readable instructions 610, 612, 614, when executed by the processor 602, cause the processor 602 to adjust the active image sensor of the electronic device 600. The machine-readable instruction 610, when executed by the processor 602, causes the processor 602 to determine an eye gaze angle (e.g., the eye gaze angle 526, 528) in relation to an optical axis (e.g., the optical axis 522, 524) of the image sensor 604, 606, respectively. The machine-readable instruction 612, when executed by the processor 602, causes the processor 602 to determine which of the eye gaze angles is a smallest eye gaze angle. The machine-readable instruction 614, when executed by the processor 602, causes the processor 602 to adjust the active image sensor to the image sensor that is associated with the smallest eye gaze angle.

For example, the machine-readable instruction 610, when executed by the processor 602, causes the processor 602 to determine a first eye gaze angle (e.g., the eye gaze angle 526) of a user (e.g., the user 500) in relation to a first optical axis (e.g., the optical axis 522) of the first image sensor (e.g., the image sensor 512) and a second eye gaze angle (e.g., the eye gaze angle 528) of the user in relation to a second optical axis (e.g., the optical axis 524) of the second image sensor (e.g., the image sensor 518). The machine-readable instruction 612, when executed by the processor 602, causes the processor 602 to determine that the first eye gaze angle is less than the second eye gaze angle and is the smallest eye gaze angle. The machine-readable instruction 614, when executed by the processor 602, causes the processor 602 to adjust the active image sensor to the first image sensor.

In various examples, the processor 602 determines that the first eye gaze angle of the user has changed. In some examples, the processor 602 determines that the first eye gaze angle of the user has changed by an amount that exceeds an eye gaze angle threshold, has changed for a duration of time that exceeds a time threshold, or a combination thereof. For example, responsive to the determination that the first eye gaze angle of the user has changed, the processor 602 determines a third eye gaze angle of the user in relation to the first optical axis of the first image sensor and a fourth eye gaze angle of the user in relation to the second optical axis of the second image sensor. Responsive to a determination that the fourth eye gaze angle is less than the third eye gaze angle, the processor 602 adjusts the active image sensor to the second image sensor. Responsive to a determination that the third eye gaze angle is less than the fourth eye gaze angle, the processor 602 adjusts the active image sensor to the first image sensor.

In some examples, responsive to a determination that the eye gaze angle of the user has changed relative to an optical axis of the active image sensor by more than a threshold amount, the processor 602 determines a third eye gaze angle of the user in relation to the first optical axis of the first image sensor and a fourth eye gaze angle of the user in relation to the second optical axis of the second image sensor. The processor 602 determines whether the third eye gaze angle or the fourth eye gaze angle is the smallest eye gaze angle and adjusts the active image sensor to the image sensor having the smallest eye gaze angle. For example, responsive to a determination that the fourth eye gaze angle is less than the third eye gaze angle, the processor 602 adjusts the active image sensor to the second image sensor. In another example, responsive to a determination that the third eye gaze angle is less than the fourth eye gaze angle, the processor 602 adjusts the active image sensor to the first image sensor.

In some examples, responsive to a determination that a facial position angle of the user exceeds the facial position angle threshold, the processor 602 determines a third eye gaze angle of the user in relation to the first optical axis of the first image sensor and determines a fourth eye gaze angle of the user in relation to the second optical axis of the second image sensor. The processor 602 determines whether the third eye gaze angle or the fourth eye gaze angle is the smallest eye gaze angle and adjusts the active image sensor to the image sensor having the smallest eye gaze angle. For example, responsive to a determination that the fourth eye gaze angle is less than the third eye gaze angle, the processor 602 adjusts the active image sensor to the second image sensor. In another example, responsive to a determination that the third eye gaze angle is less than the fourth eye gaze angle, the processor 602 adjusts the active image sensor to the first image sensor.

Figure 7:
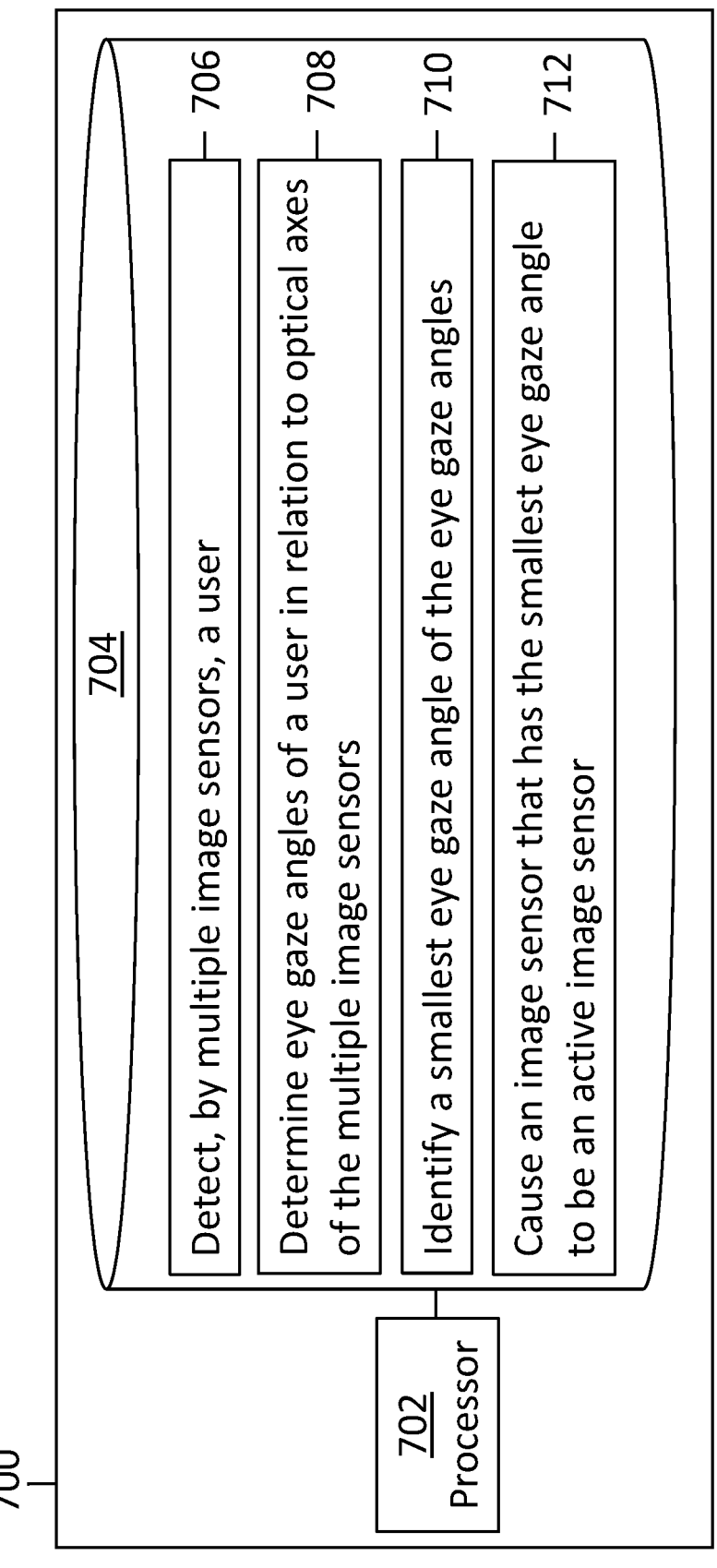
FIG. 7 is a schematic diagram for an electronic device to adjust an active image sensor, in accordance with various examples.

Referring now to FIG. 7, a schematic diagram for an electronic device 700 to adjust an active image sensor is provided, in accordance with various examples. The electronic device 700 may be the electronic device 200, 504, 600. The electronic device 700 includes a processor 702 and a non-transitory machine-readable medium 704. The processor 702 may be the processor 202, 602. The non-transitory machine-readable medium 704 may be the storage device 208, 608. The term "non-transitory" does not encompass transitory propagating signals.

In various examples, the processor 702 couples to the non-transitory machine-readable medium 704. The non-transitory machine-readable medium 704 stores machine-readable instructions. The machine-readable instructions are the machine-readable instructions 706, 708, 710, 712. The machine-readable instructions 706, 708, 710, 712, when executed by the processor 702, cause the processor 702 to perform some or all of the actions attributed herein to the processor 702.

In some examples, when executed by the processor 702, the machine-readable instructions 706, 708, 710, 712 cause the processor 702 to adjust an active image sensor. The machine-readable instruction 706, when executed by the processor 702, causes the processor 702 to detect, by multiple image sensors (e.g., the image sensors 204, 206, the image sensors 512, 518, the image sensors 604, 606), a user (e.g., the user 304, 500). The machine-readable instruction 708, when executed by the processor 702, causes the processor 702 to determine eye gaze angles (e.g., the eye gaze angles 526, 528) of the user in relation to optical axes (e.g., the optical axis 522, 524) of the multiple image sensors. The machine-readable instruction 710, when executed by the processor 702, causes the processor 702 to identify a smallest eye gaze angle of the eye gaze angles. The machine-readable instruction 712, when executed by the processor 702, causes the processor 702 to cause an image sensor that has the smallest eye gaze angle to be the active image sensor.

Responsive to a determination that a first eye gaze angle and a second eye gaze angle of the multiple eye gaze angles are within an area threshold, the processor 702 determines a first facial position angle for the first eye gaze angle and a second facial position angle for the second eye gaze angle. The processor 702 determines the smallest facial position angle and adjusts the active image sensor to an image sensor having the smallest facial position angle. For example, the first eye gaze angle is captured by a third image sensor of the electronic device and the second eye gaze angle is captured by a fourth image sensor of the electronic device 700. The third and the fourth image sensors may be image sensors of an array of image sensors, for example. In another example, the third and the fourth image sensors may be located on opposite corners or sides of a display device of the electronic device 700. The processor 702 determines that the third image sensor captures a first facial position angle of 20 degrees and that the fourth image sensor captures a second facial position angle of 70 degrees. The processor 702 determines that the first facial position angle is the smallest facial position angle and adjusts the active image sensor to the third image sensor. In some examples, a facial position setting that is adjustable utilizing a GUI may enable the user to designate when to utilize eye gaze angles.

In various examples, the processor 702 causes a display device (e.g., the display device 508, 516) to display a video signal of the active image sensor, a network interface (not explicitly shown) to transmit the video signal of the active image sensor, or a combination thereof. In other examples, responsive to a determination that a number of times that the facial position angle, the eye gaze angle, or a combination thereof of the user exceeds a change threshold, the processor 702 designates a first image sensor of the multiple image sensors as the active image sensor. The processor 702 adjusts the active image sensor to be an internal image sensor of the electronic device 700, for example. In another example, the processor 702 determines an image sensor designated as the active image sensor for a longest duration of time that starts when an application requests access to the image sensors of the electronic device 700 and adjusts the active image sensor to the image sensor having the longest duration of time. In yet another example, the processor 702 adjusts the active image sensor to be an image sensor designated by the user.

In some examples, the processor 702 causes a display device (e.g., the display device 508, 516) to display a prompt to change a location of the active image sensor. In some examples, the prompt is a mark that indicates a position at which to locate the active image sensor, an animation that indicates a position at which to locate the active image sensor, text indicating where to locate the active image sensor, or a combination thereof. For example, the mark is an "X" on a display panel of the display device that is located beneath a location that reduces a facial position angle, an eye gaze angle, or a combination thereof. In another example, the animation is a blinking arrow. In yet another example, the text explains to the user where to move the image sensor to reduce the facial position angle, the eye gaze angle, or a combination thereof.

The method 100, 400 is implemented by machine-readable instructions stored to a storage device (e.g., the storage device 208, 608, the non-transitory machine-readable medium 704) of an electronic device (e.g., the electronic device 200, 504, 600, 700), in various examples. A processor (e.g., the processor 202, 602, 702) of the electronic device executes the machine-readable instructions to perform the method 100, 400, for example. A process, as used herein, refers to operations performed by execution of machine-readable instructions by the processor. A decision point, as used herein, refers to operations performed by execution of machine-readable instructions by the processor. Unless infeasible, some or all of the blocks (e.g., process, decision point) of the method 100, 400, may be performed concurrently or in different sequences. For example, the processor performs a block that occurs responsive to a command sequential to the block describing the command. In another example, the processor performs a block that depends upon a state of a component after the state of the component is enabled.

Values for thresholds and settings described in the above examples are determined during a manufacture process, for example. As described above with respect to FIG. 2, an executable code may provide a GUI to enable a user (e.g., the user 304, 500) of an electronic device (e.g., the electronic device 200, 504, 600, 700) to adjust the thresholds and settings. The thresholds and settings may be stored to a storage device (e.g., the storage device 208, 608, the non-transitory machine-readable medium 704) of the electronic device.

The electronic device that adjusts the active image sensor among multiple image sensors provides for an enhanced user and audience experience by maintaining an appearance of the user gazing toward the audience. The appearance fosters a perception that the user is engaging with the audience. User productivity is enhanced by enabling the user to refer to multiple reference points during the interaction with the audience without having to maintain focus on a particular image sensor or manually switch between the multiple image sensors.

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. A non-transitory machine-readable medium storing machine-readable instructions which, when executed by a processor of an electronic device, cause the processor to:
   detect, by multiple image sensors, a user;
   determine, responsive to the detection of the user, eye gaze angles of the user in relation to optical axes of the multiple image sensors by:
       comparing an optical axis of each of the multiple image sensors with an eye gaze of the user to determine a respective eye gaze angle of the eye gaze angles, wherein the eye gaze angles are angles between the eye gaze of the user and the optical axis of each of the multiple image sensors;
   identify a smallest eye gaze angle among the eye gaze angles; and
   cause an image sensor of the multiple image sensors that has the smallest eye gaze angle to be an active image sensor of the electronic device.

2. The non-transitory machine-readable medium of claim 1, wherein the processor is to cause a display device to display a prompt to change a location of the active image sensor.

3. The non-transitory machine-readable medium of claim 2, wherein the prompt is a mark that indicates a position at which to locate the active image sensor, an animation that indicates the position at which to locate the active image sensor, text indicating where to locate the active image sensor, or a combination thereof.

4. The non-transitory machine-readable medium of claim 1, wherein, responsive to a determination that a number of times that the eye gaze angles change exceeds a threshold, the processor is to adjust the active image sensor to a first image sensor of the multiple image sensors.

5. The non-transitory machine-readable medium of claim 1, wherein the processor is to cause a display device to display a video signal of the active image sensor, a network interface to transmit the video signal of the active image sensor, or a combination thereof.

6. The non-transitory machine-readable medium of claim 1, wherein execution of the instructions causes the processor to:
   detect a central axis of the user's face for each image sensor of the multiple image sensors;
   determine, for each image sensor, a facial position angle of the user as an angle between the central axis for the image sensor the optical axis of the image sensor; and
   identify a smallest facial position angle among the facial position angles,
   in response to identifying the smallest facial position angle, cause another image sensor of the multiple image sensors to be the active image sensor of the electronic device, wherein the another image sensor corresponds to the smallest facial position angle.

7. An electronic device, comprising:
a first image sensor;
a second image sensor; and
a processor to:
   determine a first eye gaze angle of a user in relation to a first optical axis of the first image sensor by comparing the first optical axis of the first image sensor with a first eye gaze of the user, wherein the first eye gaze angle is a first angle between the first eye gaze of the user and the first optical axis;
   determine a second eye gaze angle of the user in relation to a second optical axis of the second image sensor by comparing the second optical axis of the second image sensor with a second eye gaze of the user, wherein the second eye gaze angle is a second angle between the second eye gaze of the user and the second optical axis; and
   adjust, responsive to a determination that the first eye gaze angle is less than the second eye gaze angle, an active image sensor to the first image sensor.

8. The electronic device of claim 7, wherein, responsive to a determination that the first eye gaze angle has changed, the processor is to:
   determine a third eye gaze angle of the user in relation to the first optical axis of the first image sensor;
   determine a fourth eye gaze angle of the user in relation to the second optical axis of the second image sensor; and
   adjust, responsive to a determination that the fourth eye gaze angle is less than the third eye gaze angle, the active image sensor to the second image sensor.

9. The electronic device of claim 8, wherein the processor is to determine that the first eye gaze angle has changed for a duration of time that exceeds a threshold.

10. The electronic device of claim 8, wherein the processor is to determine that the first eye gaze angle has changed by an amount that exceeds a threshold.

11. The electronic device of claim 7, wherein, responsive to a determination that a facial position angle of the user exceeds a threshold, the processor is to:
   determine a third eye gaze angle of the user in relation to the first optical axis of the first image sensor;
   determine a fourth eye gaze angle of the user in relation to the second optical axis of the second image sensor; and
   adjust, responsive to a determination that the fourth eye gaze angle is less than the third eye gaze angle, the active image sensor to the second image sensor.

12. The electronic device of claim 7, wherein the processor further:
   detect a plurality of facial features and a plurality of eye landmarks of the user, wherein the first eye gaze angle and the second eye gaze angle of the user is determined based on the plurality of facial features and a plurality of eye landmarks.

13. The electronic device of claim 12, wherein the plurality of eye landmarks comprises at least one of an outer corner, an inner corner, an iris, or a pupil.

14. An electronic device, comprising:
a first image sensor;
a second image sensor; and
a processor to:

detect a first central axis of a user's face;
   determine a first facial position angle of the user in relation to a first optical axis of the first image sensor, wherein the first facial position angle is a first angle between the first central axis and the first optical axis;
   detect a second central axis of the user's face;
   determine a second facial position angle of the user in relation to a second optical axis of the second image sensor, wherein the second facial position angle is a second angle between the second central axis and the second optical axis; and
   adjust, responsive to a determination that the first facial position angle is less than the second facial position angle, an active image sensor to the first image sensor.

15. The electronic device of claim 14, wherein the processor is to adjust, responsive to a determination that the second facial position angle is less than the first facial position angle, the active image sensor to the second image sensor.

16. The electronic device of claim 14, wherein the processor is to:
   determine a first eye gaze angle of the user in relation to the first optical axis of the first image sensor;
   determine a second eye gaze angle of the user in relation to the second optical axis of the second image sensor; and
   adjust, responsive to a determination that the second eye gaze angle is less than the first eye gaze angle, the active image sensor to the second image sensor.

17. The electronic device of claim 15, wherein the processor is to:
   detect a change in a third facial position angle of the user in relation to a third optical axis of the active image sensor; and
   responsive to a determination that the change exceeds a threshold,
      determine a fourth facial position angle of the user in relation to the first optical axis of the first image sensor;
      determine a fifth facial position angle of the user in relation to the second optical axis of the second image sensor; and
   adjust, responsive to a determination that the fifth facial position angle is less than the fourth facial position angle, the active image sensor to the second image sensor.

18. The electronic device of claim 14, wherein the processor is to:
   detect a change in a third facial position angle of the user in relation to a third optical axis of the active image sensor; and
   responsive to a determination that the change exceeds a threshold,
      determine a first eye gaze angle of the user in relation to the first optical axis of the first image sensor;
      determine a second eye gaze angle of the user in relation to the second optical axis of the second image sensor; and
   adjust, responsive to a determination that the second eye gaze angle is less than the first eye gaze angle, the active image sensor to the second image sensor.

* * * * *